United States Patent
Anglin et al.

(10) Patent No.: US 10,634,062 B2
(45) Date of Patent: Apr. 28, 2020

(54) TWO-SHAFT TOWER SHAFT SUPPORT

(71) Applicant: United Technologies Corporation, Farmington, CT (US)

(72) Inventors: Christopher T. Anglin, Manchester, CT (US); Yuk-Kwan Brian Yuen, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 356 days.

(21) Appl. No.: 15/465,224

(22) Filed: Mar. 21, 2017

(65) Prior Publication Data

US 2018/0274449 A1     Sep. 27, 2018

(51) Int. Cl.
| | |
|---|---|
| *F02C 7/32* | (2006.01) |
| *F02C 7/36* | (2006.01) |
| *F02C 7/06* | (2006.01) |
| *F16H 57/021* | (2012.01) |
| *F16H 57/023* | (2012.01) |
| *F16H 57/038* | (2012.01) |

(52) U.S. Cl.
CPC .................. *F02C 7/32* (2013.01); *F02C 7/06* (2013.01); *F02C 7/36* (2013.01); *F16H 57/021* (2013.01); *F16H 57/023* (2013.01); *F16H 57/038* (2013.01); *F05D 2220/32* (2013.01); *F05D 2230/60* (2013.01); *F05D 2240/60* (2013.01); *F05D 2260/941* (2013.01)

(58) Field of Classification Search
CPC ...... F02C 7/06; F02C 7/32; F02C 7/36; F05D 2240/60; F16H 57/021; F16H 57/023; F16H 57/038
See application file for complete search history.

(56) References Cited

U.S. PATENT DOCUMENTS

| | | | |
|---|---|---|---|
| 7,055,330 B2 | 6/2006 | Miller | |
| 8,511,967 B2 | 8/2013 | Suciu et al. | |
| 8,973,465 B2 | 3/2015 | Duong | |
| 2005/0183540 A1 | 8/2005 | Miller | |
| 2009/0188334 A1 | 7/2009 | Merry et al. | |
| 2012/0186270 A1* | 7/2012 | Tatman | F01D 11/003 60/796 |
| 2016/0169040 A1* | 6/2016 | Anglin | F01D 25/183 415/230 |
| 2016/0169118 A1 | 6/2016 | Duong | |
| 2017/0044987 A1 | 2/2017 | Curlier et al. | |

FOREIGN PATENT DOCUMENTS

| | | |
|---|---|---|
| EP | 1447543 A2 | 8/2004 |
| EP | 3045657 A1 | 7/2016 |

OTHER PUBLICATIONS

Extended European Search Report for EP Application No. 18162271.3, dated Jul. 16, 2018, 7 pages.

* cited by examiner

Primary Examiner — Scott J Walthour
(74) Attorney, Agent, or Firm — Kinney & Lange, P.A.

(57) ABSTRACT

A tower shaft support for a gearbox of a gas turbine engine includes a mounting ring, first and second gussets, and first and second tower shaft bearing mounts. Each gusset extends outward from and substantially normal to an outer circumference of the mounting ring. The first and second tower shaft bearing mounts are positioned between the first and second gussets.

15 Claims, 5 Drawing Sheets

TWO-SHAFT TOWER SHAFT SUPPORT

BACKGROUND

The present invention is related to gearbox assemblies of gas turbine engines, and more particularly to a static support structure for a tower shaft.

A tower shaft support can be used to mount a tower shaft for an accessory gearbox in a gas turbine engine. Gearbox assemblies generally include a single tower shaft connecting a bevel gear to a driving gear on a main shaft of the engine to drive accessory components (e.g., electrical generators, fuel pumps, oil pumps, and starter). The addition of a second tower shaft to drive additional components can be advantageous. However, the addition of the second tower shaft, including a second tower shaft support, can require complicated modification of the gas turbine engine static structure and can add undesirable weight to the engine. A need exists for a single support structure that can mount two tower shafts.

SUMMARY

In one aspect, a tower shaft support for a gearbox of a gas turbine engine includes a mounting ring, first and second gussets, and first and second tower shaft bearing mounts. Each gusset extends outward from and substantially normal to an outer circumference of the mounting ring. The first and second tower shaft bearing mounts are positioned between the first and second gussets.

In another aspect, a method of mounting multiple tower shafts in a gas turbine engine includes mounting a first tower shaft in a tower shaft support, mounting a second tower shaft in the tower shaft support, and attaching the tower shaft support to a static structure of the gas turbine engine. The first and second tower shafts are mounted to the tower shaft support such that the first and second tower shafts are held at a distance from each other by a stiffening member of the tower shaft support, which separates the first and second tower shafts.

In yet another aspect, a two-shaft tower shaft support for a gas turbine engine includes a mounting ring, a first and a second gusset, and a first and second tower shaft bearing mount. Each gusset extends outward from and substantially normal to an outer circumference of the mounting ring. The first and second tower shaft bearing mounts are positioned between the first and second gussets and adjacent to the mounting ring. The first tower shaft bearing mount is adjacent the first gusset and the second tower shaft bearing mount is adjacent the second gusset.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Figure 1:
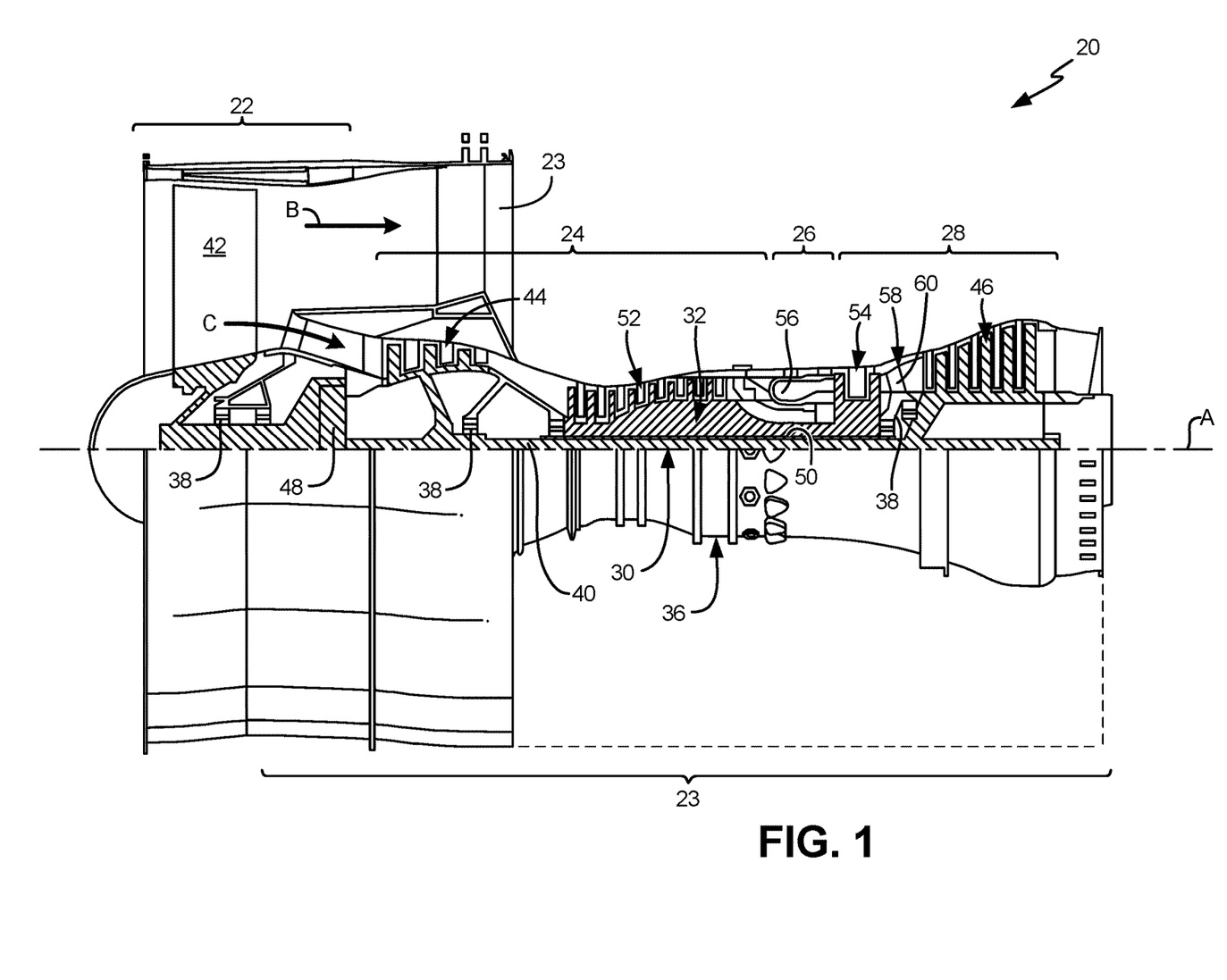
FIG. 1 is a quarter sectional view of a gas turbine engine.

FIG. 1 is a quarter sectional view that schematically illustrates an example gas turbine engine 20 that includes a fan section 22, a compressor section 24, a combustor section 26 and a turbine section 28. Alternative engines might include an augmenter (not shown) among other systems or features. The fan section 22 drives air along a bypass flow path B through a bypass duct 23 while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 can drive the fan 42 through a speed change device, such as a geared architecture 48, to drive the fan 42 at a lower speed than the low speed spool 30. Alternatively, the inner shaft 40 can drive the fan 42 and the low speed spool 30 directly. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 can be arranged generally between the high pressure turbine 54 and the low pressure turbine 46. The mid-turbine frame 58 further supports bearing systems 38 in the turbine section 28 as well as setting airflow entering the low pressure turbine 46. The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46.

Figure 2:
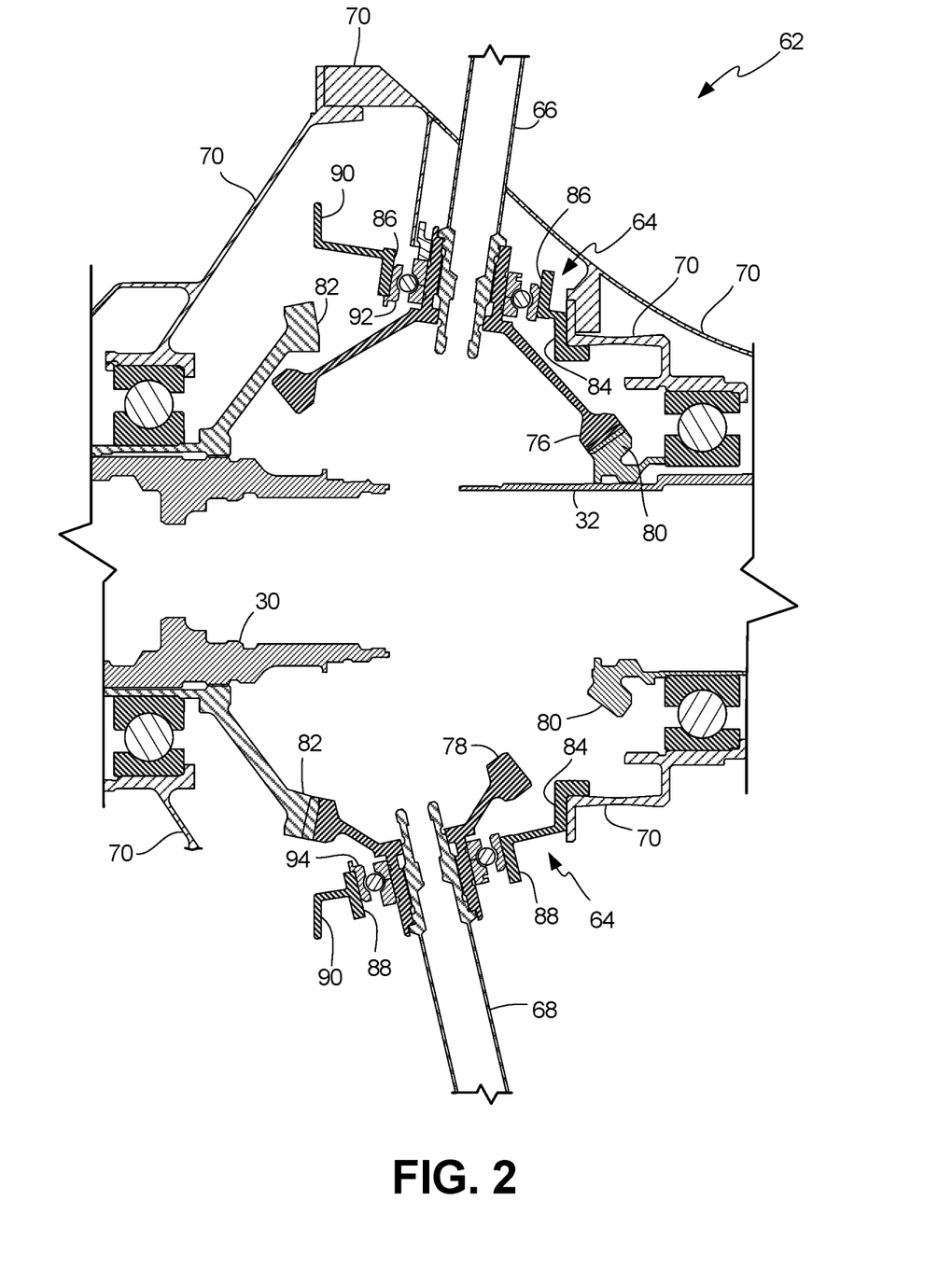
FIG. 2 is a cross-sectional view of a two-tower shaft assembly mounted in a gas turbine engine.

FIG. 2 is a cross-sectional view of tower shaft assembly 62 mounted in gas turbine engine 20. Tower shaft assembly 62 can include tower shaft support 64, tower shaft 66, tower shaft 68, static structure 70, high speed spool 32, and low speed spool 30. Tower shaft support 64 can be mounted to static structure 70 and can mount tower shaft 66 and tower shaft 68. Tower shafts 66 and 68 can include bevel gears 76 and 78, respectively. In one embodiment, bevel gear 76 can be coupled to bull gear 80 on high speed spool 32, while bevel gear 78 can be coupled to bull gear 82 on low speed spool 30. In alternative embodiments, both tower shafts 66 and 68 can be coupled to high speed spool 32 or low speed spool 30, such that both tower shafts 66 and 68 are driven by high speed spool 32 or low speed spool 30. In yet another embodiment, tower shafts 66 and 68 can be coupled to each other with one of tower shafts 66 or 68 coupled to high speed spool 32 or low speed spool 30. In this manner both tower shafts 66 and 68 can be driven by high speed spool 32 or low speed spool 30 with one of tower shafts 66 and 68 being driven indirectly via the other of tower shafts 66 and 68. In general, the configuration used can be dependent on the components being powered (e.g., accessories can be coupled to the drive shaft providing the rotational speed at which the accessory most efficiently operates). Some components, such as the starter, may require connection to high speed spool 32, whereas others, such as the electrical generator, can be driven by either high speed spool 32 or low speed spool 30. The addition of a second tower shaft effectively allows power to be extracted from air flow, which drives low speed spool 30.

Tower shaft support 64 can include mounting ring 84, bearing mounts 86 and 88, and flange 90. Mounting ring 84 can be secured to static structure 70. Bearing mounts 86 and 88 can be adjacent mounting ring 84 and can separate mounting ring 84 from flange 90. Bearing mount 86 can house bearing 92, allowing the rotation of bevel gear 76 of tower shaft 66. Bearing mount 88 can house bearing 94, allowing the rotation of bevel gear 78 of tower shaft 68. Flange 90 can lack mounting elements, such that flange 90 floats unmounted. Tower shaft support 64 can accommodate both tower shafts 66 and 68 in any of the above-mentioned drive arrangements. The one-sided mounting configuration of tower shaft support 64 via mounting ring 84 allows for the installation of both tower shafts 66 and 68 in gas turbine engine 20 without significant redesign over a single-tower shaft installation. Furthermore, the compact size of tower shaft support 64 can limit the weight added to gas turbine engine 20 with the implementation of a second tower shaft.

Figure 3:
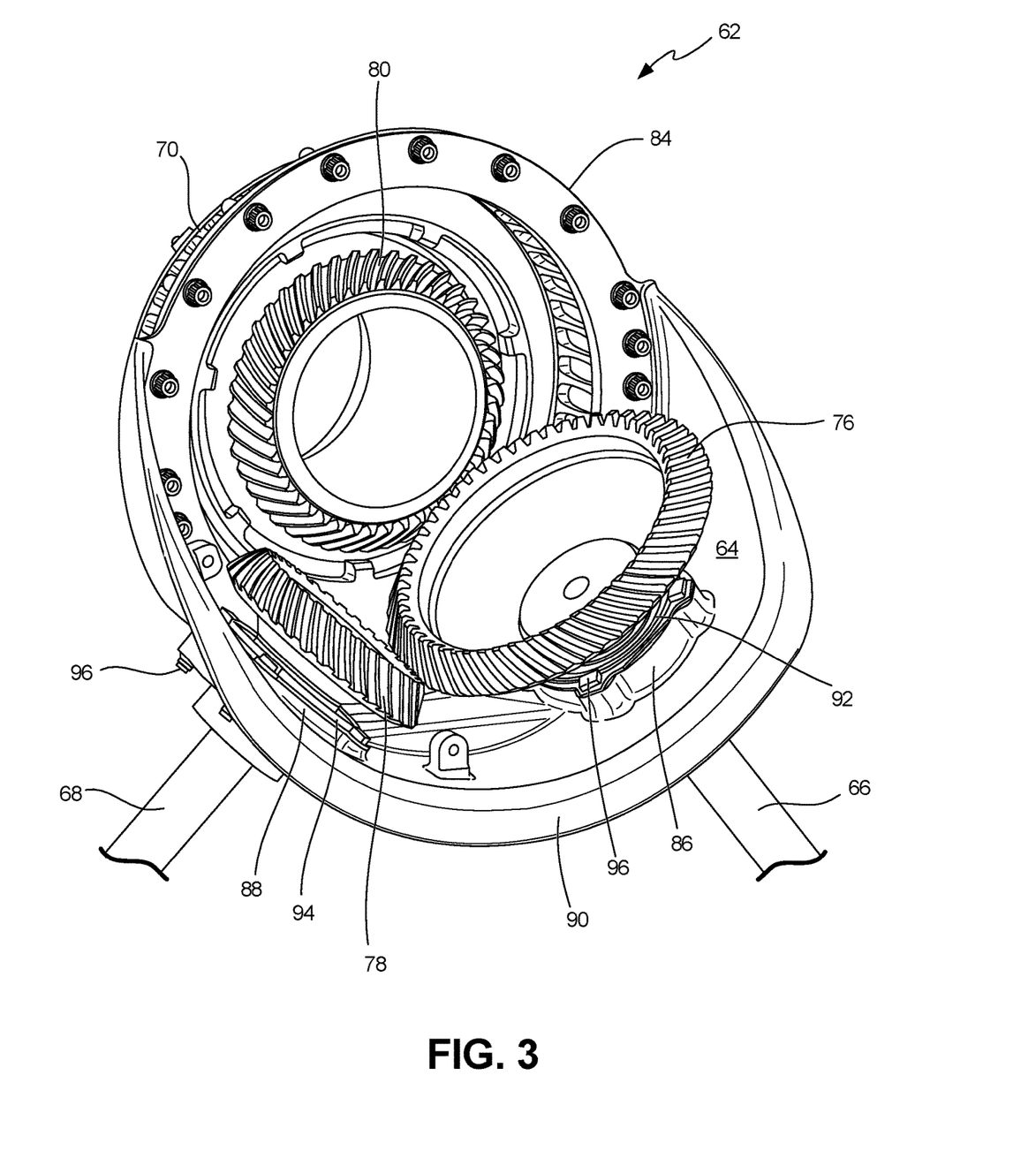
FIG. 3 is a perspective view of one embodiment of a tower shaft support assembly.

FIG. 3 is a perspective view of one embodiment of tower shaft support assembly 62, showing tower shaft support 64 with mounting ring 84, connected to static structure 70, and free-floating flange 90, tower shaft 66 with bevel gear 76, tower shaft 68 with bevel gear 78, bull gear 80, bearing mounts 86 and 88, and bearings 92 and 94. As shown in FIG. 3, mounting ring 84 can be connected to static structure 70 by a plurality of bolts positioned around a circumference of mounting ring 84. It will be understood by one of ordinary skill in the art that the position and types of fastening members can be varied as appropriate to provide adequate support to tower shafts 66 and 68 during operation. Additionally, it will be understood that mounting ring 84 can have additional fastening structures to provide additional stability to tower shaft support 64.

Bearings 92 and 94 allow for the rotation of bevel gears 76 and 78, respectively. As shown in FIG. 3, bearings 92 and 94 can mount to tower shafts 66 and 68, respectively, at a base of bevel gears 76 and 78, respectively. Bearings 92 and 94 can be mounted to tower shaft support 64 using fasteners 96, which can include any type of fastener know in the art, not limited to bolts, screws, rivets, and welds. In the embodiment shown in FIG. 3, tower shaft 66 can be driven by high speed spool 32 (not shown) via bull gear 80, and tower shaft 68 can be driven by low speed spool 30 (not shown) via bull gear 82 (not shown). As previously discussed, tower shafts 66 and 68 can be driven by high speed spool 32, low speed spool 30, or the other of tower shafts 66 and 68.

Figure 4A:
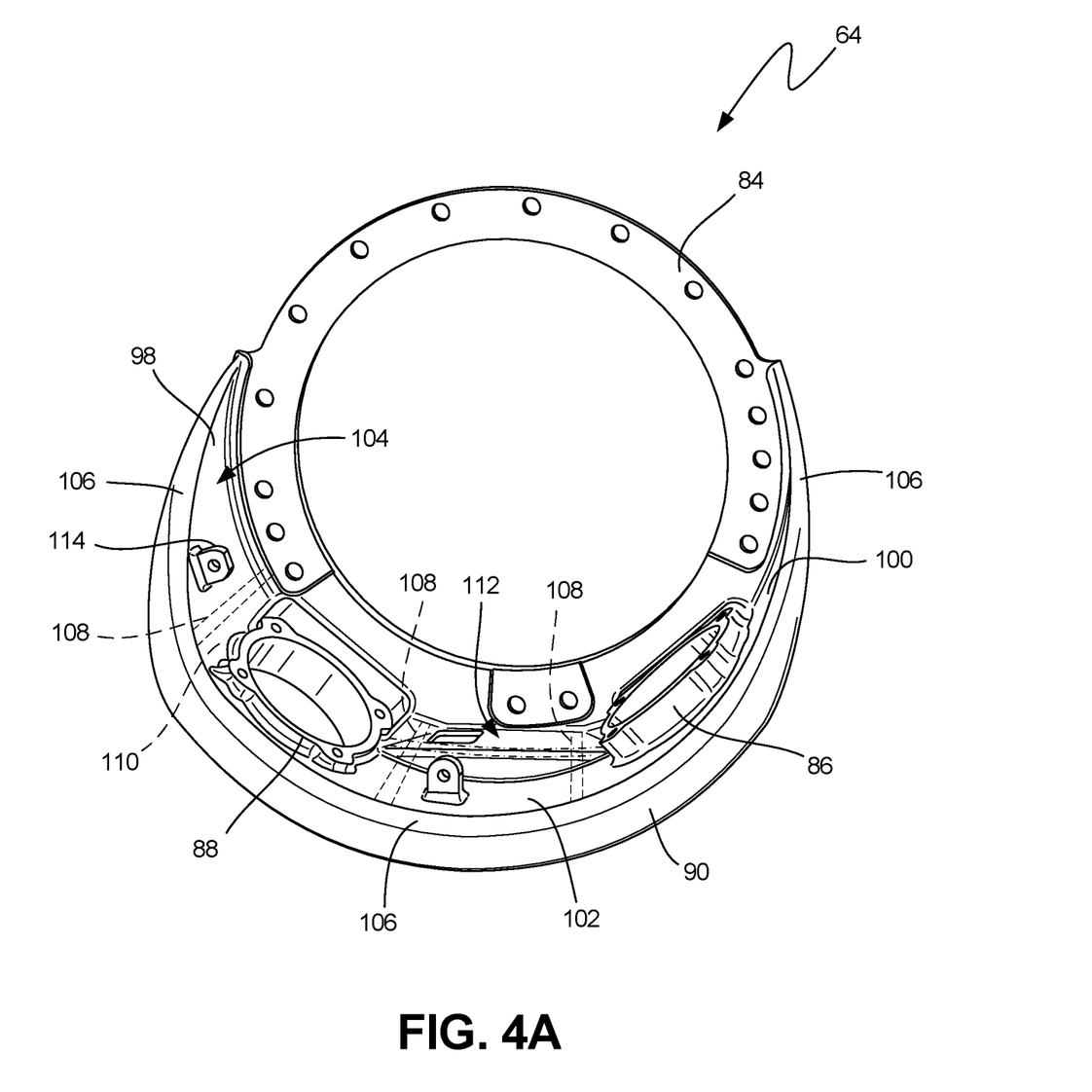
FIG. 4A is a perspective view of the tower shaft support of FIG. 3.
Figure 4B:
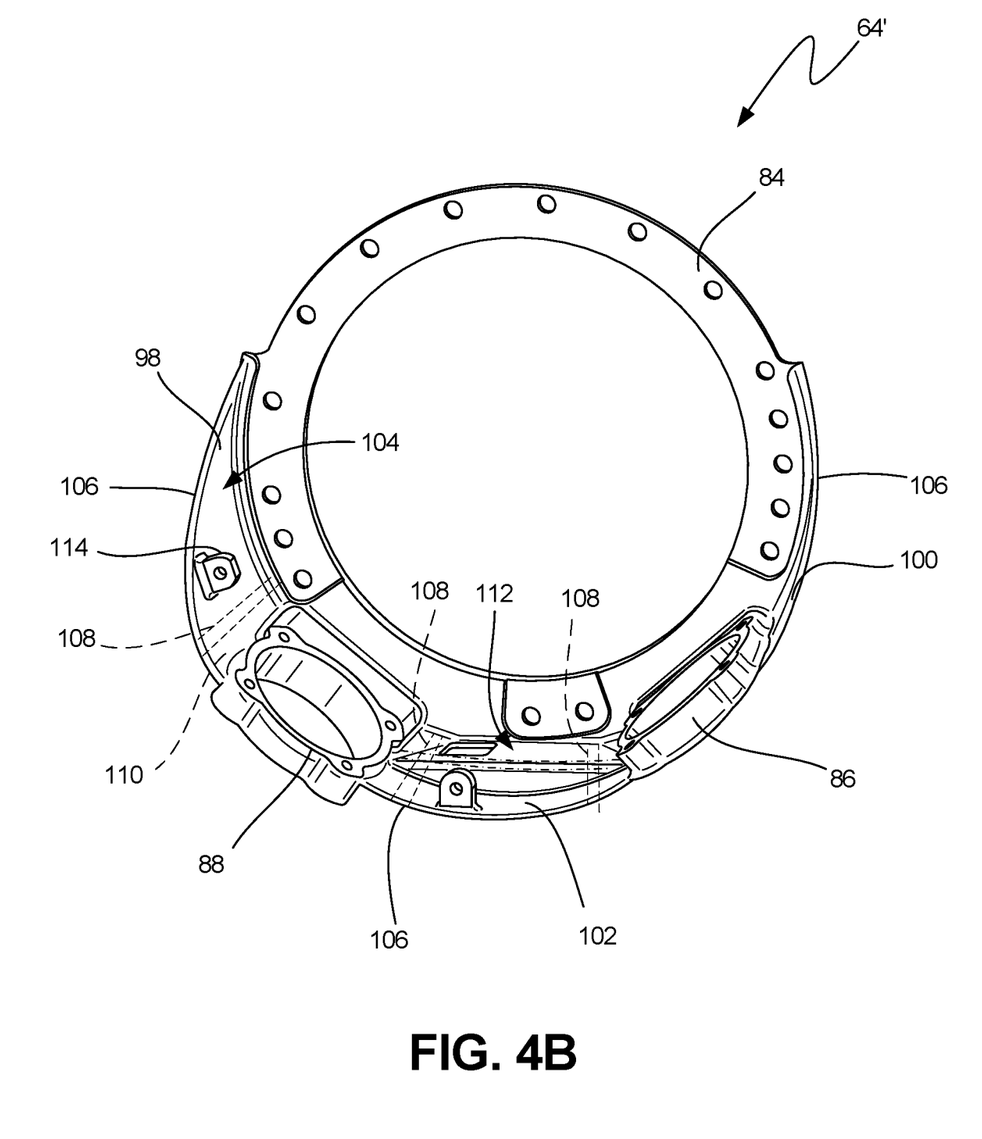
FIG. 4B is a perspective view of an alternative embodiment of a tower shaft support.

FIG. 4A is a perspective view of tower shaft support 64 of FIG. 3. FIG. 4B is a perspective view of an alternative embodiment of tower shaft support 64'. FIGS. 4A and 4B show mounting ring 84, bearing mounts 86 and 88, and flange 90. Bearing mounts 86 and 88 can be positioned through a support body extending outward from and substantially normal to an outer circumference of mounting ring 84, formed by structurally supporting gussets 98 and 100 and stiffening member 102. Gussets 98 and 100 and stiffening member 102 can have curved inner radial surfaces 104 that substantially follow a contour of the outer circumference of mounting ring 84. Gussets 98 and 100 can each have outer edge 106, which forms an outer edge of inner radial surfaces 104. Each outer edge 106 can adjoin mounting ring 84 at a first end. Outer edge 106 of gusset 98 can extend angularly from mounting ring 84 to bearing mount 88, and outer edge 106 of gusset 100 can extend angularly from mounting ring 84 to bearing mount 86, such that outer edges 106 are separated from mounting ring 84 by an increasing distance from the first end at mounting ring 84 to a second end at bearing mounts 86 and 88. Stiffening member 102 can extend between bearing mounts 86 and 88, such that bearing mount 86 is adjacent gusset 98 on one side and adjacent stiffening member 102 on an opposite side, and such that bearing mount 88 is adjacent gusset 100 on one side and stiffening member 102 on an opposite side. As shown in FIG. 4B, gussets 98 and 100 extend to, but not beyond, bearing mounts 86 and 88, such that gussets 98 and 100 remain separated from stiffening member 102. In the embodiment shown in FIG. 4A, inner radial surfaces 104 of gussets 98 and 100 can join inner radial surface 104 of stiffening member 102 to form a common inner radial surface. In this manner, outer edges 106 can extend to a position axially outward from bearing mounts 86 and 88 and join outer edge 106 of stiffening member 102, forming a common outer edge extending from the first end of gusset 98 at mounting ring 84 to the first end of gusset 100 at mounting ring 84. Outer edge 106, as shown in both FIGS. 4A and 4B, can float unmounted in gas turbine engine 20. It will be understood by one of ordinary skill in the art that the purpose of gussets 98 and 100 and stiffening member 102 is to provide sufficient structural support to retain tower shafts 66 and 68 in a proper position of engagement with bull gears 80 and 82 or each other during operation. For this reason, it will be understood that the shape of gussets 98 and 100 and stiffening member 102, including curved inner radial surface 104, can be modified within the scope of the present invention while still providing operational structural stability for tower shafts 66 and 68.

Bearing mounts 86 and 88, and thereby tower shafts 66 and 68, can be separated by stiffening member 102 by any distance that can allow bevel gears 76 and 78 to optimally engage bull gears 80 and 82 or each other. In one embodiment, either bearing mount 86 or 88 can be raised relative to inner radial surface 104 to position one bevel gear 76 or 78 outward from the other bevel gear 76 or 78 such that operation of one bevel gear 76 or 78 does not interfere with the operation of the other bevel gear 76 or 78. Additionally, either bearing mount 86 or 88 can be displaced farther from mounting ring 84 than the other of bearing mount 86 or 88 to prevent interference of bevel gears 76 and 78. Bearing mounts 86 and 88 can be positioned adjacent mounting ring 84 or can be set apart from mounting ring 84 by the same or varying distances. Bearing mount 86 can be set apart from bearing mount 88 by any distance allowing for proper alignment between bevel gears 76 and 78 and bull gears 80 and 82. It will be understood by one of ordinary skill to modify gussets 98 and 100 and stiffening member 102 to accommodate varying arrangements of bearing mounts 86 and 88.

In some embodiments, flange 90 (FIG. 4A) can be included to provide additional strength to tower shaft support 64. Flange 90 can extend radially outward from and substantially normal to outer edge 106 and can float unmounted in gas turbine engine 20. One or more ribs 108 can be positioned on outer radial surface 110 opposite inner radial surface 104 of gussets 98 and 100 and stiffening member 102. Ribs 108 can extend from mounting ring 84 to flange 90 (FIG. 4A) or toward outer edge 106 (FIG. 4B). Ribs 108 can also extend from bearing mount 86 to bearing mount 88 to provide additional strength to stiffening member 102 to overcome operational loads that tend to push tower shafts 66 and 68 away from each other, and to retain tower shafts 66 and 68 in proper position during operation such that teeth of bevel gears 86 and 88 and bull gears 80 and 82 remain aligned. In alternative embodiments, ribs 108 can be positioned on inner radial surfaces 104. It will be understood by one of ordinary skill in the art to vary the number, position, and shape of ribs 108 to provide adequate structural support and stability for tower shafts 66 and 68. Stiffening member 102 can also include asymmetrical feature 112. Asymmetrical feature 112 can provide access to components inside tower shaft support 64 during servicing as well as provide additional structural support between tower shafts 66 and 68 during operation.

In addition to providing adequate support for both tower shafts 66 and 68 during operation, tower shaft supports 64 and 64' have been designed to limit the collection of oil or lubricant leaked from the gearbox during operation. The curvature of inner radial surface 104 reduces the potential for oil to pool or collect around tower shafts 66 and 68.

Tower shaft supports 64 and 64' can be made of any material appropriate for the environmental conditions in which tower shaft supports 64 and 64' are located and having a sufficient strength to control the motion of bevel gears 76 and 78. For example, tower shaft supports 64 and 64' located in a front center body of gas turbine engine 20 and can be made of a titanium alloy, aluminum alloy, composite materials, or steel. Tower shaft supports 64 and 64' can be cast as a single piece, including mounting ring 84, flange 90, gussets 98 and 100, stiffening member 102, bearing mounts 86 and 88, and ribs 108. Portions of tower shaft support 64 can also be machined. Tower shaft support 64 can include additional mounts 114 to secure oil or lubricant supply lines or other components.

Tower shaft supports 64 and 64' can accommodate both tower shaft 66 and tower shaft 68 in a wide variety of drive configurations. Tower shaft supports 64 and 64' can generally be installed in existing gas turbine engines 20 without a need for complicated redesign of the static structure and with limited or no additional weight as compare to single-tower shafts supports. Additionally, the shape of tower shaft supports 64 and 64' can reduce the potential for the collection of oil leaked from the gearbox around tower shafts 66 and 68.

Discussion of Possible Embodiments

The following are non-exclusive descriptions of possible embodiments of the present invention.

A tower shaft support for a gearbox of a gas turbine engine includes a mounting ring, first and second gussets, and first and second tower shaft bearing mounts. Each gusset extends outward from and substantially normal to an outer circumference of the mounting ring. The first and second tower shaft bearing mounts are positioned between the first and second gussets.

The tower shaft support of the preceding paragraph can optionally include, additionally and/or alternatively, any one or more of the following features, configurations and/or additional components:

A further embodiment of the foregoing tower shaft support, wherein the first and second gussets can have curved inner radial surfaces substantially following a contour of the outer circumference of the mounting ring.

A further embodiment of any of the foregoing tower shaft supports, wherein the first tower shaft bearing mount can be adjacent the first gusset and the second tower shaft bearing mount can be adjacent the second gusset.

A further embodiment of any of the foregoing tower shaft supports can further include a stiffening member having an inner radial surface. The stiffening member can extend between the first and second tower shaft bearing mounts.

A further embodiment of any of the foregoing tower shaft supports, wherein the inner radial surface of the first gusset can have a first outer edge and the inner radial surface of the second gusset can have a second outer edge. Each of the first and second outer edges can adjoin the mounting ring at a first end and extend angularly to the first and second tower shaft bearing mounts, respectively, at a second end opposite the first, such that each of the outer edges are separated from the mounting ring by an increasing distance from the first end to the second end.

A further embodiment of any of the foregoing tower shaft supports, wherein the outer edges of the first and second gussets can extend axially outward from the first and second tower shaft bearing mounts and join an outer edge of the stiffening member, such that a common outer edge is formed extending from the first end of the first gusset to the first end of the second gusset.

A further embodiment of any of the foregoing tower shaft supports can further include a flange extending radially outward from the common edge.

A further embodiment of any of the foregoing tower shaft supports can further include one or more ribs positioned on an outer radial surface of one of the first gusset, second gusset, and stiffening member, and extending from the flange toward the mounting ring.

A further embodiment of any of the foregoing tower shaft supports, wherein the stiffening member can further include a thickened section along the inner radial surface extending between the first and second tower shaft bearing mounts.

A further embodiment of any of the foregoing tower shaft supports, wherein one of the first and second tower shaft bearing mounts can be raised relative to the inner radial surfaces of the first and second gussets and stiffening member.

A method of mounting multiple tower shafts in a gas turbine engine includes mounting a first tower shaft in a tower shaft support, mounting a second tower shaft in the tower shaft support, and attaching the tower shaft support to a static structure of the gas turbine engine. The first and second tower shafts are mounted to the tower shaft support such that the first and second tower shafts are held at a distance from each other by a stiffening member of the tower shaft support, which separates the first and second tower shafts.

The method of the preceding paragraph can optionally include, additionally and/or alternatively, any one or more of the following features, configurations and/or additional components or steps:

A further embodiment of the foregoing method, wherein attaching the tower shaft support to the static structure of the gas turbine engine can include attaching a mounting ring to the static structure.

A further embodiment of any of the foregoing methods can further include allowing an edge of the tower shaft support adjacent the first and second tower shafts and opposite the ring mount to float unmounted in the gas turbine engine.

A further embodiment of any of the foregoing methods, wherein mounting the first and second tower shafts can include displacing a bevel gear of one of the first and second tower shafts farther from the tower shaft support than a bevel gear of the other of the first and second tower shafts.

A two-shaft tower shaft support for a gas turbine engine includes a mounting ring, a first and a second gusset, and a first and second tower shaft bearing mount. Each gusset extends outward from and substantially normal to an outer circumference of the mounting ring. The first and second tower shaft bearing mounts are positioned between the first and second gussets and adjacent to the mounting ring. The first tower shaft bearing mount is adjacent the first gusset and the second tower shaft bearing mount is adjacent the second gusset.

The two-shaft tower shaft support of the preceding paragraph can optionally include, additionally and/or alternatively, any one or more of the following features, configurations and/or additional components:

A further embodiment of the foregoing two-shaft tower shaft support can further include a stiffening member. The stiffening member can extend between the first and second tower shaft bearing mounts.

A further embodiment of any of the foregoing two-shaft tower shaft supports, wherein the first and second gussets can have curved inner radial surfaces substantially following a contour of the outer circumference of the mounting ring.

A further embodiment of any of the foregoing two-shaft tower shaft supports, wherein the first and second gussets can each have an outer edge adjacent the inner radial surface and wherein each of the outer edges can adjoin the mounting ring at a first end and extends angularly to one of the first and second tower shaft bearing mounts at an opposite end, such that the outer edges are separated from the mounting ring by an increasing distance from the first end to the second end.

A further embodiment of any of the foregoing two-shaft tower shaft supports, wherein the edges of the first and second gussets can extend outward from the first and second tower shaft bearing mounts and join an edge of the stiffening member, such that a common edge is formed extending from the first end of the first gusset to the first end of the second gusset.

A further embodiment of any of the foregoing two-shaft tower shaft supports can further include a flange extending radially outward from the common edge. The flange can lack mounting elements, such that upon installation in a gas turbine engine, the flange floats unmounted.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of mounting multiple tower shafts in a gas turbine engine, the method comprising:
   mounting a first tower shaft in a tower shaft support;
   mounting a second tower shaft in the tower shaft support such that the first and second tower shafts are held at a distance from each other by a stiffening member of the tower shaft support separating the first and second tower shafts; and
   attaching the tower shaft support to a static structure of the gas turbine engine;
   wherein the tower shaft support comprises:
      a mounting ring;
      a first gusset and a second gusset, each gusset extending outward from and substantially normal to an outer circumference of the mounting ring;

a first tower shaft bearing mount;
a second tower shaft bearing mount, wherein each of the first and second tower shaft bearing mounts is positioned between the first and second gussets, and wherein the first tower shaft bearing mount is adjacent the first gusset and the second tower shaft bearing mount is adjacent the second gusset; and
a stiffening member extending between the first and second tower shaft bearing mounts;
wherein the first gusset has a first outer edge and the second gusset has a second outer edge; and
wherein the first outer edge adjoins the mounting ring at a first end of the first outer edge and extends angularly to the first tower shaft bearing mount such that the first outer edge is separated from the mounting ring by an increasing distance from the first end of the first outer edge to the first tower shaft bearing mount; and
wherein the second outer edge adjoins the mounting ring at a first end of the second outer edge and extends angularly to the second tower shaft bearing mount such that the second outer edge is separated from the mounting ring by an increasing distance from the first end of the second outer edge to the second tower shaft bearing mount.

2. The method of claim 1, wherein attaching the tower shaft support to the static structure of the gas turbine engine comprises:
attaching the mounting ring to the static structure.

3. The method of claim 2 and further comprising:
allowing the first and second gussets and stiffening member of the tower shaft support to float unmounted in the gas turbine engine.

4. The method of claim 1, wherein mounting the first and second tower shafts comprises displacing a bevel gear of one of the first tower shaft or the second tower shaft farther from the tower shaft support than a bevel gear of the other of the first tower shaft or the second tower shaft.

5. A tower shaft support for a gearbox of a gas turbine engine comprising:
a mounting ring;
a first gusset and a second gusset, each gusset extending outward from and substantially normal to an outer circumference of the mounting ring;
a first tower shaft bearing mount;
a second tower shaft bearing mount, wherein each of the first and second tower shaft bearing mounts is positioned between the first and second gussets, and wherein the first tower shaft bearing mount is adjacent the first gusset and the second tower shaft bearing mount is adjacent the second gusset; and
a stiffening member extending between the first and second tower shaft bearing mounts;
wherein the first gusset has a first outer edge and the second gusset has a second outer edge; and
wherein the first outer edge adjoins the mounting ring at a first end of the first outer edge and extends angularly to the first tower shaft bearing mount such that the first outer edge is separated from the mounting ring by an increasing distance from the first end of the first outer edge to the first tower shaft bearing mount; and
wherein the second outer edge adjoins the mounting ring at a first end of the second outer edge and extends angularly to the second tower shaft bearing mount such that the second outer edge is separated from the mounting ring by an increasing distance from the first end of the second outer edge to the second tower shaft bearing mount.

6. The tower shaft support of claim 1, wherein the first and second gussets have curved surfaces substantially following a contour of an outer circumference of the mounting ring.

7. The tower shaft support of claim 1, wherein the first and second outer edges of the first and second gussets join an outer edge of the stiffening member, such that a common outer edge is formed extending from the first end of the first outer edge to the first end of the second outer edge.

8. The tower shaft support of claim 7 and further comprising:
a flange extending radially outward from the common edge.

9. The tower shaft support of claim 8 and further comprising:
a rib positioned on an outer radial surface of one of the first gusset, second gusset, or stiffening member, the rib extending from the flange toward the mounting ring.

10. The tower shaft support of claim 1, wherein the stiffening member further comprises:
a thickened section along an inner radial surface extending between the first and second tower shaft bearing mounts.

11. The tower shaft support of claim 1, wherein one of the first tower shaft bearing mount or the second tower shaft bearing mount is raised relative to the stiffening member and inner radial surfaces of the first and second gussets.

12. A two-shaft tower shaft support for a gas turbine engine comprising:
a mounting ring;
a first gusset and a second gusset, each gusset extending outward from and substantially normal to an outer circumference of the mounting ring;
a first tower shaft bearing mount positioned between the first and second gussets and adjacent to the mounting ring;
a second tower shaft bearing mount positioned between the first and second gussets and adjacent to the mounting ring;
wherein the first tower shaft bearing mount is adjacent the first gusset and the second tower shaft bearing mount is adjacent the second gusset; and a stiffening member, wherein the stiffening member extends between the first and second tower shaft bearing mounts;
wherein the first gusset has a first outer edge and the second gusset has a second outer edge;
wherein the first outer edge adjoins the mounting ring at a first end of the first outer edge and extends angularly to the first tower shaft bearing mount such that the first outer edge is separated from the mounting ring by an increasing distance from the first end of the first outer edge to the first tower shaft bearing mount; and
wherein the second outer edge adjoins the mounting ring at a first end of the second outer edge and extends angularly to the second tower shaft bearing mount such that the second outer edge is separated from the mounting ring by an increasing distance from the first end of the second outer edge to the second tower shaft bearing mount.

13. The two-shaft tower shaft support of claim 12, wherein the first and second gussets have curved inner surfaces substantially following a contour of an outer circumference of the mounting ring.

14. The two-shaft tower shaft support of claim 12, wherein the first and second outer edges of the first and second gussets join an edge of the stiffening member, such that a common edge is formed extending from the first end of the first outer edge to the first end of the second outer edge.

15. The two-shaft tower shaft support of claim 14 and further comprising:
   a flange extending outward from the common edge, wherein the flange lacks mounting elements, such that upon installation in a gas turbine engine, the flange floats unmounted.

* * * * *